No. 649,824. Patented May 15, 1900.
O. DRUSCHKY.
MUD GUARD FOR WHEELS.
(Application filed Nov. 24, 1899.)

(No Model.)

Witnesses
Inventor
Oscar Druschky
by James L. Norris

United States Patent Office.

OSCAR DRUSCHKY, OF BERLIN, GERMANY.

MUD-GUARD FOR WHEELS.

SPECIFICATION forming part of Letters Patent No. 649,824, dated May 15, 1900.

Application filed November 24, 1899. Serial No. 738,150. (No model.)

*To all whom it may concern:*

Be it known that I, OSCAR DRUSCHKY, engineer, a subject of the King of Prussia, German Emperor, residing at Linienstrasse 248, Berlin, in the Kingdom of Prussia, German Empire, have invented certain new and useful Improvements in or Relating to Mud-Guards for Wheels, of which the following is a specification.

At present vehicle-riders and the public are usually protected against the mud thrown up by the wheels by the so-called "mud-guards" made of sheet metal or other material fastened suitably around the wheel. According to the present invention the same result is obtained by providing the wheels with brushes for the purpose of cleaning the wheel during the rotation of the latter, thus completely preventing the throwing up of mud.

Figure 1:
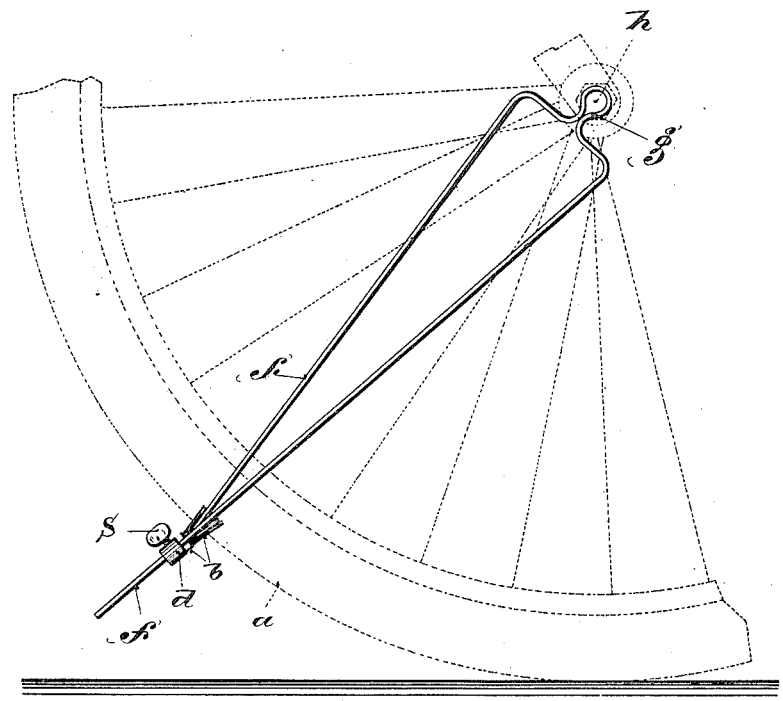
Figure 2:
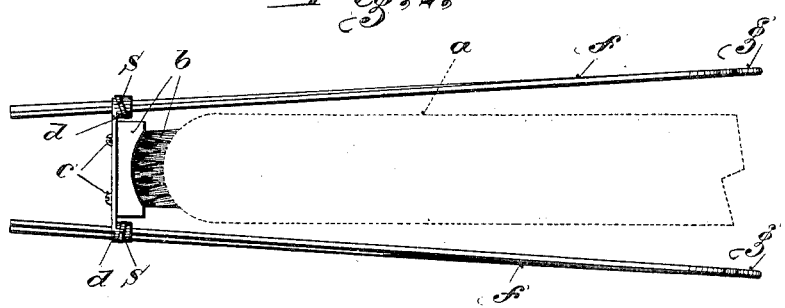

In the accompanying drawings such a brush mud-guard is represented as applied to a cycle-wheel, Figure 1 being an elevation, and Fig. 2 a plan of the device.

The brush $b$ is arranged in slight contact with the wheel-rim $a$ and is secured by means of screws $c$ to a metal part $d$, so that the brush can be readily removed and exchanged when desired. This metal part $d$ is attached to and supported by two brackets secured to the opposite sides of the wheel-axle $h$, each bracket consisting of a strand or rod of wire bent intermediate its ends to provide two arms $f$, over the free ends of which the metal part $d$ is slipped, the bent portion of the wire being shaped to provide an eye $g$, through which the axle $h$ passes, as clearly shown in the drawings. These rods $f$ are firmly fixed on the axle $h$ by means of the usual nuts and can be easily removed. The metal plate $d$ is suitably fixed on the rods $f$ by clamping-screws S. The rods $f$ are so fixed on the axle $h$ of the wheel that the brushes $b$ are a few inches above the ground. The metal plate $d$ is so placed that the brush but slightly touches the tire of the wheel in order to avoid as much as possible friction between the two, while at the same time preventing mud and moisture passing upward. In dry weather the brush $b$ and the metal piece $d$ may be taken off and secured on again in bad weather.

The brush mud-guard is so arranged that it is not at all conspicuous and is of small weight, while, on the other hand, it meets its object better than all similar devices, preventing the excessive splashing or throwing of mud and the consequent unsightliness of the vehicle, inasmuch as all mud adhering to the wheel-tire is immediately taken off by the said brush a little distance above the track.

It is exceedingly easy to clean the brush of any mud adhering to it, while the cleaning of sheet-iron mud-guards and other devices used at present is troublesome and disagreeable.

Having now particularly described and ascertained the nature of the said invention and in what manner the same is to be performed, I declare that what I claim is—

A mud-guard for bicycles, consisting of brackets located on opposite sides of the wheel and each bracket comprising a wire rod bent intermediate its ends to provide an eye $g$ adapted to receive the axle of the wheel and by which said brackets are supported in position, the free ends of said wire being brought together so as to lie parallel with each other, a brush-holder $d$ removably supported upon the said free ends of the wire, a brush $b$ carried by the holder, and means for adjustably securing the brush-holder in position, substantially as described.

In testimony whereof I have hereunto set my hand in presence of two subscribing witnesses.

OSCAR DRUSCHKY.

Witnesses:
 WOLDEMAR HAUPT,
 HENRY HASPER.